Patented Apr. 17, 1945

2,373,864

UNITED STATES PATENT OFFICE 2,373,864

REFRACTORY COMPOSITION AND METHOD OF MAKING THE SAME

Eugene Wainer, Niagara Falls, N. Y., assignor to The Titanium Alloy Manufacturing Company, Niagara Falls, N. Y.

No Drawing. Application May 11, 1943,
Serial No. 486,559

11 Claims. (Cl. 106—57)

The present invention relates to a method of making refractory compositions and more particularly to methods and compositions for manufacturing zircon refractories. More specifically the invention relates to the manufacture of zircon refractory compositions by means of slip casting. Zirconium silicate or zircon has found extensive use as a refractory material, particularly in those fields in which a refractory is desired having high resistance to abrasion and corrosion by liquid slags, glasses and fluid melts generally.

Heretofore most zircon refractories have been produced by methods other than slip casting. However, due to the fact that the peculiar uses of zircon refractories require the most diverse shapes and articles having tight dense surfaces, the most convenient method of forming these articles would be to cast a slurry of the zircon raw material into plaster of Paris molds by conventional slip casting procedures.

Many attempts have been made heretofore to slip cast zircon or zirconium silicate. These attempts however, have been without exception discarded and comments may be found in the literature to the effect that zircon cannot be slip cast but that refractories can be made of it only by ramming, piggering and the like. In the prior attempts to slip cast zircon refractories, no satisfactory method was devised for obtaining completely deflocculated slurries and therefore, slurries that could be poured into plaster of Paris molds without flocculation. As a consequence all attempts to produce slip cast zircon refractories resulted in articles which cracked and shattered on drying and firing. That is to say, entirely unsatisfactory products were produced either by reason of cracking, uneven shrinkage, or due to the production of a porous open structure readily attached by the corrosive melts with which the article came in contact in contrast to the tight dense surface structure demanded by the conditions of use of the refractory article.

The present invention provides a method for slip casting zirconium silicate. The invention also provides a composition that can be readily and easily slip in plaster of Paris molds with the production of articles that can be dried and fired without cracking and shattering. The invention also provides a method for producing zircon refractories by slip casting methods that have tight dense corrosive resistant surfaces.

In accordance with the present invention, pourable slurries suitable for slip casting are produced of finely milled zirconium silicate or zircon, that is to say material having a degree of fineness such that the powder will pass through 325 mesh. The type of zircon suitable for use in the slip casting composition and method of the present invention will depend upon the use to which the ultimate refractory is to be put, but in general a raw material should have a zirconium silicate content of at least 96%, and in most instances the content of zirconium silicate in the zircon should be preferably 99% or higher.

The extremely high density of the zircon yields high gravity slips which have a tendency to settle or segregate and the amounts of water and deflocculating agents employed to produce pourable slurries suitable for slip casting most be regulated accurately and exactly to avoid any tendency for flocculation of the slurry before pouring or after being poured into the mold.

In accordance with the present invention the necessary defloccualtion of the zircon slurry is obtained by incorporating in the slurry a small amount of a water dispersible colloid and a small amount of a water soluble alkaline material. Completely deflocculated slurries having a requisite pouring consistency for slip casting are therefore made, in accordance with the present invention, from zircon powder of extremely fine mesh, mixed with a small amount of water having contained therein a relatively small quantity of an alkaline material and of a water dispersible colloid.

The water dispersible colloid admixed with the finely divided zircon may be any colloid forming a sol in water and which is more or less completely dispersible or peptizable in pure water. That is to say, the colloid of the invention includes gels and gel-forming materials that are characterized by relatively slow diffusibility in water, usually of gelatinous or non-crystalline character and of relatively huge apparent molecular weights. In general these colloids are non-electrolytes. The size of such colloid particles is such that they are ultra-microscopically visible. Although the term colloid has been used herein, the determination of whether or not a particular colloid possesses the utility desired for the present invention depends upon the huge true or apparent molecular weight of the substance in water, as exhibited by the characteristic water dispersible unit or micelle.

As examples of colloidal materials having utility in this invention and falling within the definition above set forth, are the following: starches such as corn starch, root starch, potato starch, and the like, dextrin, albumin, serum albumin, blood serum, soluble dried blood, tannins, tannic acid, gelatine, glue, agar agar, alginic acid, kelp extracts, humus and compost extracts, extracts of decayed leaves, gums such as acacia and tragacanth, pectins, glycogens, and proteins generally. The proteins are particularly useful and animal or vegetable proteins may be employed, as for instance, casein, soy bean protein, or the proteins of wheat, corn, maize or even collagen or bouillon.

In addition to and in conjunction with the water dispersible colloid the slurry of zircon and water contains a small amount of a water soluble alkaline material. Those alkalis which are monobasic and which have a dissociation constant for the hydroxyl ion equal to or larger than $1.0 \times 10^{-5}$ may be suitably employed in the present invention. These alkalis include hydroxides of the alkali metals including ammonium hydroxide, simple and substituted alkylamines, either primary, secondary, tertiary or mixed amines, the substituted amines known as "onium" or "oxonium" compounds, as for instance, ethyl or methyl ammonium hydroxide as well as certain heterocyclic aromatic compounds such as piperidine.

The quantity of colloid incorporated in the slurry is from 0.002 to 1.0% based upon the dry weight of the zircon. Generally amounts in the neighborhood of 0.1% are entirely satisfactory for the production of completely deflocculated slurries, although in the case of certain of the proteins amounts in the neighborhood of 1.0% give most satisfactory results; generally the less proteinaceous the material, the smaller the amount required and flocculation may be caused by the employment of too large a quantity. When dealing with the proteinaceous colloids it may be more satisfactory in the operation of the invention and in the production of deflocculated slurries for slip casting to solubilize the protein by the employment of about 0.01% to 1.0% of the alkali, based on the weight of the protein, before mixing with the zircon powder.

The amount of alkali required may be from about 0.002% to 0.1% based on the weight of the dry zircon. More than about 0.1% of the alkali is in general not required, and additions of over 0.5% of alkali cause the slip to flocculate or set up.

The amount of water to be admixed with the zircon powder, the water dispersible colloid and alkali is quite critical. Generally the water content should be sufficient to produce a pourable slip but not so great an amount as to flocculate the slip. Depending upon the degree of fineness the water content may vary from 11% to about 17½% based on the dry weight of the zirconium silicate. In general, the amount of water to be employed with finely milled material of −325 mesh should be from about 15½% to 17½% of the weight of the zircon while with mixes containing particles somewhat larger in size the amount of water based on the zircon should be from about 11% to 13%.

In manufacturing the refractory, the slurry is made up as heretofore described, poured into the plaster of Paris molds, dried and then fired at 1600° C. or higher. Where it is desired to produce a refractory article having exceptional corrosion resistance to molten fluids, the article may be fired at 1800° C. to 1900° C.

The slips may be made of graded ground zircon although best corrosion resistance is obtained where the degree of fineness of the zirconium silicate is −325 mesh. Articles with somewhat better heat shock resistance may be obtained by using a mixture of relatively fine and relatively coarser particles, as for instance, 50 to 70 parts of zircon of −60 +200 mesh and 50 to 30 parts of −325 mesh zircon.

The following are examples of compositions producing completely deflocculated slurries of zircon that are suitable for slip casting in plaster of Paris molds.

Example 1

1000 grams of −325 mesh zirconium silicate
165 cc. of water
0.2 to 5.0 grams of NaOH or KOH
0.5 to 5.0 grams of water dispersible colloid such as animal or vegetable protein, tannin, tannic acid, glue, gum arabic, starch, etc. After casting in plaster molds, dry and fire to at least 1600° C.

Example 2

600 grams of −60 +200 mesh zircon sand
400 grams of −325 mesh zirconium silicate
120 cc. of water
0.1 to 3.0 grams of NaOH or KOH
0.05 to 3.0 grams of water dispersible colloid such as in Example 1. After casting in plaster molds, dry and fire to at least 1600° C.

Example 3

Same as Example 1, except substitute NH₄OH for NaOH or KOH.

Example 4

Same as Example 2, except substitute NH₄OH for NaOH or KOH.

Examples 5 and 5a

Same as Examples 3 and 4 except substitute for NH₄OH ethyl ammonium hydroxide or any organic base from the class of primary, secondary, tertiary, or mixed, simple or substituted alkyl amines, substituted amines such as "onium," or "oxonium" compounds, piperidine, and which are soluble in water.

The above examples are inserted as illustrative of the invention and are not to be deemed limitative thereof as the scope of the invention is outlined in the appended claims.

What is claimed is:

1. A composition suitable for forming refractory structures comprising essentially finely divided zirconium silicate, 0.002% to 0.5% of a water dispersible colloid and 0.002% to 0.5% of a monohydroxyl base, such percentages being based on the weight of the zirconium silicate.

2. A composition suitable for forming refractory structures comprising essentially finely divided zirconium silicate, 0.002% to 0.5% of a water dispersible colloid and 0.002% to 0.5% of an alkali having a dissociation constant greater than $1 \times 10^{-5}$, such percentages being based on the weight of the zirconium silicate.

3. A composition suitable for forming refractory structures comprising essentially finely divided zirconium silicate, 0.002% to 0.5% of a water dispersible colloid and 0.002% to 0.5% of an alkali metal hydroxide, such percentages being based on the weight of the zirconium silicate.

4. A composition suitable for forming refractory stuctures comprising essentially finely divided zirconium silicate, 0.002% to 0.5% of a water dispersible colloid and 0.002% to 0.5% of an amine, such percentages being based on the weight of the zirconium silicate.

5. A composition suitable for forming refractory structures comprising essentially finely divided zirconium silicate, 0.002% to 0.5% of a water dispersible colloid and 0.002% to 0.5% of a substituted ammonium hydroxide, such percentages being based on the weight of the zirconium silicate.

6. A pourable slurry suitable for slip casting comprising essentially zirconium silicate, 11% to 17½% water, 0.002% to 0.5% of a water dispersible colloid and 0.002% to 0.5% of a monohydroxyl base, such percentages being based on the weight of zirconium silicate.

7. A pourable slurry suitable for slip casting comprising essentially zirconium silicate, 11% to 17½% water, 0.002% to 0.5% of a water dispersible colloid and 0.002% to 0.5% of an alkali having a dissociation constant greater than $1 \times 10^{-5}$, such percentages being based on the weight of the zirconium silicate.

8. A pourable slurry suitable for slip casting comprising essentially zirconium silicate, 11% to 17½% water, 0.002% to 0.5% of a water dispersible colloid and 0.002% to 0.5% of an alkali metal hydroxide, such percentages being based on the weight of the zirconium silicate.

9. A pourable slurry suitable for slip casting comprising essentially zirconium silicate, 11% to 17½% water, 0.002% to 0.5% of a water dispersible colloid and 0.002% to 0.5% of an amine, such percentages being based on the weight of the zirconium silicate.

10. A pourable slurry suitable for slip casting comprising essentially zirconium silicate, 11% to 17½% water, 0.002% to 0.5% of a water dispersible colloid and 0.002% to 0.5% of a substituted ammonium hydroxide, such percentages being based on the weight of the zirconium silicate.

11. The method of forming a refractory article which comprises making a pourable slurry from zirconium silicate, 11% to 17½% water, 0.002% to 0.5% of a water dispersible colloid and 0.002% to 0.5% of a monohydroxyl base, such percentages being based on the weight of zirconium silicate, casting the slurry into a plaster of Paris mold, drying the article so molded and thereafter firing said article to at least 1600° C.

EUGENE WAINER.

---

CERTIFICATE OF CORRECTION.

Patent No. 2,373,864. April 17, 1945.

EUGENE WAINER.

It is hereby certified that error appears in the printed specification of the above numbered patent requiring correction as follows: Page 1, first column, line 27, for "piggering" read --jiggering--; line 46, after "slip" insert --cast--; and second column, line 14, for "most" read --must--; and that the said Letters Patent should be read with this correction therein that the same may conform to the record of the case in the Patent Office.

Signed and sealed this 19th day of June, A. D. 1945.

Leslie Frazer

Acting Commissioner of Patents.

(Seal)

vided zirconium silicate, 0.002% to 0.5% of a water dispersible colloid and 0.002% to 0.5% of a substituted ammonium hydroxide, such percentages being based on the weight of the zirconium silicate.

6. A pourable slurry suitable for slip casting comprising essentially zirconium silicate, 11% to 17½% water, 0.002% to 0.5% of a water dispersible colloid and 0.002% to 0.5% of a monohydroxyl base, such percentages being based on the weight of zirconium silicate.

7. A pourable slurry suitable for slip casting comprising essentially zirconium silicate, 11% to 17½% water, 0.002% to 0.5% of a water dispersible colloid and 0.002% to 0.5% of an alkali having a dissociation constant greater than $1 \times 10^{-5}$, such percentages being based on the weight of the zirconium silicate.

8. A pourable slurry suitable for slip casting comprising essentially zirconium silicate, 11% to 17½% water, 0.002% to 0.5% of a water dispersible colloid and 0.002% to 0.5% of an alkali metal hydroxide, such percentages being based on the weight of the zirconium silicate.

9. A pourable slurry suitable for slip casting comprising essentially zirconium silicate, 11% to 17½% water, 0.002% to 0.5% of a water dispersible colloid and 0.002% to 0.5% of an amine, such percentages being based on the weight of the zirconium silicate.

10. A pourable slurry suitable for slip casting comprising essentially zirconium silicate, 11% to 17½% water, 0.002% to 0.5% of a water dispersible colloid and 0.002% to 0.5% of a substituted ammonium hydroxide, such percentages being based on the weight of the zirconium silicate.

11. The method of forming a refractory article which comprises making a pourable slurry from zirconium silicate, 11% to 17½% water, 0.002% to 0.5% of a water dispersible colloid and 0.002% to 0.5% of a monohydroxyl base, such percentages being based on the weight of zirconium silicate, casting the slurry into a plaster of Paris mold, drying the article so molded and thereafter firing said article to at least 1600° C.

EUGENE WAINER.

CERTIFICATE OF CORRECTION.

Patent No. 2,373,864. April 17, 1945.

EUGENE WAINER.

It is hereby certified that error appears in the printed specification of the above numbered patent requiring correction as follows: Page 1, first column, line 27, for "piggering" read --jiggering--; line 46, after "slip" insert --cast--; and second column, line 14, for "most" read --must--; and that the said Letters Patent should be read with this correction therein that the same may conform to the record of the case in the Patent Office.

Signed and sealed this 19th day of June, A. D. 1945.

Leslie Frazer

Acting Commissioner of Patents.

(Seal)